(12) United States Patent
Lin et al.

(10) Patent No.: US 10,581,058 B2
(45) Date of Patent: Mar. 3, 2020

(54) WELDING ASSEMBLY FOR LIQUID-INJECTION HOLE OF SECONDARY BATTERY

(71) Applicant: CONTEMPORARY AMPEREX TECHNOLOGY CO., LIMITED, Ningde (CN)

(72) Inventors: Wenfa Lin, Ningde (CN); Yuqian Wen, Ningde (CN); Chao Yang, Ningde (CN); Lei Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 147 days.

(21) Appl. No.: 15/868,968

(22) Filed: Jan. 11, 2018

(65) Prior Publication Data
US 2018/0138492 A1  May 17, 2018

Related U.S. Application Data

(63) Continuation of application No. PCT/CN2016/082995, filed on May 23, 2016.

(30) Foreign Application Priority Data

Jul. 15, 2015  (CN) .................... 2015 2 0510595 U

(51) Int. Cl.
*H01M 2/36* (2006.01)
*H01M 2/04* (2006.01)
(Continued)

(52) U.S. Cl.
CPC ......... *H01M 2/365* (2013.01); *H01M 2/0456* (2013.01); *H01M 2/36* (2013.01); *H01M 10/0525* (2013.01); *B23K 2101/36* (2018.08)

(58) Field of Classification Search
CPC ............ H01M 2/36; H01M 2/04; H01M 2/10; H01M 2/12
See application file for complete search history.

(56) References Cited

U.S. PATENT DOCUMENTS

2006/0257733 A1\* 11/2006 Kim .................... H01M 2/0486
429/185
2008/0160393 A1\* 7/2008 Kim ........................ H01M 2/08
429/94
(Continued)

FOREIGN PATENT DOCUMENTS

CN  102986062 A   3/2013
CN  202905851 U   4/2013
(Continued)

OTHER PUBLICATIONS

International Search Report from corresponding International Patent Application No. PCT/CN2016/082995, dated Aug. 29, 2016.

*Primary Examiner* — Kenneth J Douyette
(74) *Attorney, Agent, or Firm* — Tucker Ellis LLP

(57) ABSTRACT

A welding assembly for a liquid-injection hole of a secondary battery, including a top cover of a case, a liquid-injection hole, a sealing cover-plate and a stress release structure, wherein the liquid-injection hole is disposed in the top cover and includes a assembling recess and a through-hole arranged sequentially from top to bottom of the top cover, the assembling recess and the through-hole present a stepped transition and the radial dimension of the assembling recess is larger than that of the through-hole. The sealing cover-plate is accommodated in the assembling recess and the stress release structure is provided at one or both sides of the welding portion and capable of releasing stress from the welding portion. The welding assembly provides a stress release structure nearby the welding portion, and when the welding portion is full-strength welded, the stress-release (Continued)

structure can effectively release stress nearby the welding seam.

13 Claims, 7 Drawing Sheets

(51) Int. Cl.
  *H01M 2/12* (2006.01)
  *H01M 10/0525* (2010.01)
  *B23K 101/36* (2006.01)

(56) References Cited

U.S. PATENT DOCUMENTS

| | | | | |
|---|---|---|---|---|
| 2009/0075169 A1* | 3/2009 | Kim | ................... | H01M 2/0404 |
| | | | | 429/185 |
| 2013/0115492 A1* | 5/2013 | Aota | ................... | H01M 2/365 |
| | | | | 429/82 |
| 2013/0202927 A1* | 8/2013 | Kim | ................... | H01M 2/365 |
| | | | | 429/82 |

FOREIGN PATENT DOCUMENTS

| | | |
|---|---|---|
| CN | 203659981 U | 6/2014 |
| CN | 203830931 U | 9/2014 |
| CN | 204809306 U | 11/2015 |
| JP | 2006040690 A | 2/2006 |

\* cited by examiner

WELDING ASSEMBLY FOR LIQUID-INJECTION HOLE OF SECONDARY BATTERY

CROSS-REFERENCE TO RELATED APPLICATIONS

The present application is a continuation of International Application No. PCT/CN2016/082995, filed on May 23, 2016, which claims priority to Chinese Patent Application No. 201520510595.5, filed on Jul. 15, 2015, the contents of both of which are incorporated herein by reference in their entireties.

TECHNICAL FIELD

The present application relates to the field of energy storage devices and, more particularly, to a welding assembly for a liquid-injection hole of a secondary battery.

BACKGROUND

In the manufacturing process of a secondary battery (for example, a lithium-ion battery), a liquid-injection hole on the top cover of the case needs to be sealing welded by laser after completion of the liquid-injection process, so as to prevent leakage of the electrolyte.

In the related art, as shown in FIGS. 1-2, the specific implementation process includes: firstly plugging the liquid-injection hole 20 with a T-shaped sealing nail so as to prevent the electrolyte from flowing out of the hole and thus contaminating the welding seam, then cleaning the electrolyte remaining on the surface of the welding area, and finally sealing the welding portion 400 between the sealing cover-plate 40 and the liquid-injection hole 20 in a manner of laser full-length welding. A full-length welding seam is formed after completion of the welding.

Stress will be formed in the welding process due to thermal expansion and contraction, and the welding stress will remain in the welding seam if it cannot be released, and the welding seam is a flat annular welding seam, thus the welding stress concentration phenomenon is obvious, when the welding stress reaches a certain extent, the welding seam will crack to form a welding crack. At present, as for the full-length welding, the problem of welding crack caused by the welding stress has not been completely solved till now, in particular, tiny cracks cannot be easily detected, which may easily causes liquid leakage, and thus there is a great potential safety risk.

Principle of formation of the welding crack is: the thermal effect of welding leads to welding internal stress in the welding seam, in the full-length welding process, when the welding seam contains relatively more impurities having low melting points, the impurities tend to accumulate at the center of the welding seam to form a liquid film, and under the action of a relatively greater tensile stress, the welding seam will crack and form welding cracks.

SUMMARY

The present application provides a welding assembly for a liquid-injection hole of a secondary battery, which can effectively prevent the occurrence of welding cracks.

The present application provides a welding assembly for a liquid-injection hole of a secondary battery, including a top cover of a case; a liquid-injection hole; a sealing cover-plate; and a stress release structure; wherein the liquid-injection hole is defined in the top cover and includes an assembling recess and a through-hole arranged sequentially from top to bottom of the top cover, the sealing cover-plate is accommodated in the assembling recess without falling into the through-hole, and an upper edge of the sealing cover-plate and an upper edge of the assembling recess form a welding portion for welding, the stress release structure is provided at one side or both sides of the welding portion, and is configured to release stress from the welding portion.

Optionally, the stress release structure includes a first stress release slot provided on the sealing cover-plate, and the first stress release slot is distributed annularly along an edge of the sealing cover-plate.

Optionally, the stress release structure further includes a second stress release slot provided on the top cover, and the second stress release slot is distributed annularly along an edge of the assembling recess.

Optionally, a shortest distance from the first stress release slot and/or the second stress release slot to the welding portion is 0.1-1 mm.

Optionally, a shape of a cross section of the first stress release slot and/or the second stress release slot is rectangular, trapezoidal, arc or triangular.

Optionally, a depth of the first stress release slot and/or the second stress release slot is 0.1-5.5 mm.

Optionally, the stress release structure includes an annular boss provided on the top cover, and the assembling recess is surrounded by the annular boss.

Optionally, a minimum thickness of the annular boss is 0.1-1 mm.

Optionally, a height of the annular boss is 0.1-5.5 mm.

Optionally, an included angle between an external lateral surface of the annular boss and the top cover is a right angle or an obtuse angle.

Optionally, an avoiding chamber recessed toward an interior of the sealing cover-plate is provided at the bottom of the sealing cover-plate, and the avoiding chamber is surrounded by the first stress release slot and is separated from the first stress release slot by a partition wall.

Optionally, a thickness of the partition wall is smaller than a thickness between the avoiding chamber and an upper surface of the sealing cover-plate.

Optionally, the partition wall is obliquely arranged.

Optionally, the partition wall is inwardly tilted from bottom to top toward the middle of the sealing cover-plate.

Optionally, a fillet transition is formed between the first stress release slot and/or the avoiding chamber and the partition wall.

The technical solution provided by the present application can achieve the following beneficial effects:

The welding assembly for a liquid-injection hole of the secondary battery provided by the present application provides a stress release structure nearby the welding portion of the sealing cover-plate and the assembling recess, and when the welding portion is full-strength welded, the stress-release structure can effectively release the stress nearby the welding seam, so as to prevent the occurrence of welding cracks.

It should be understood that both the above general description and the following detailed description are exemplary only and will not limit the disclosure.

REFERENCE SIGNS

Figure 1:
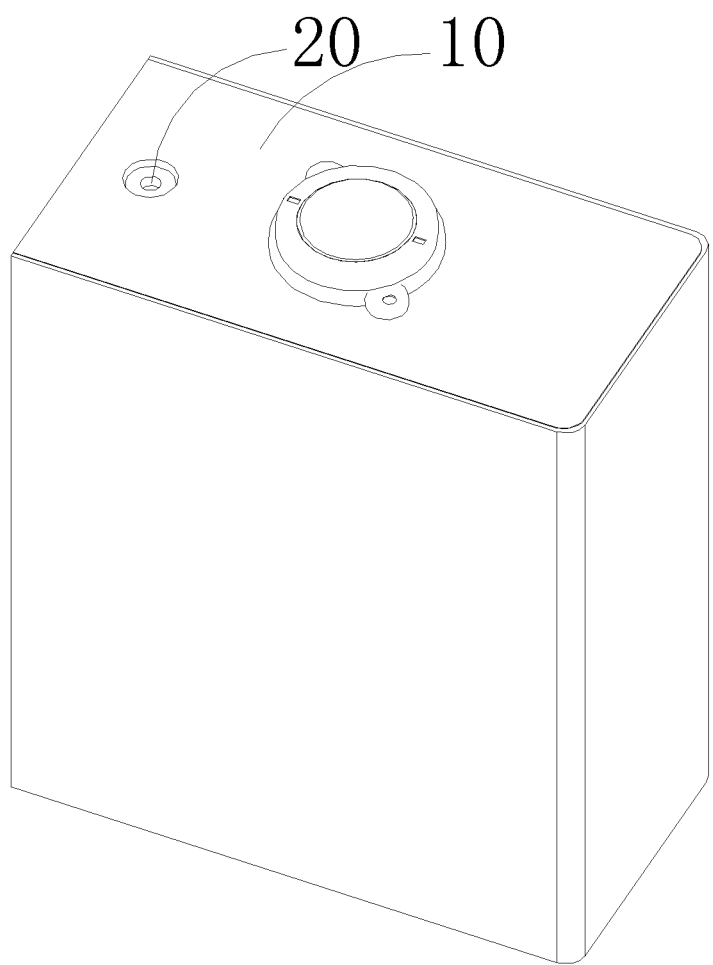
FIG. 1 is an overall structural schematic view of a secondary battery provided in the related art.
Figure 2:
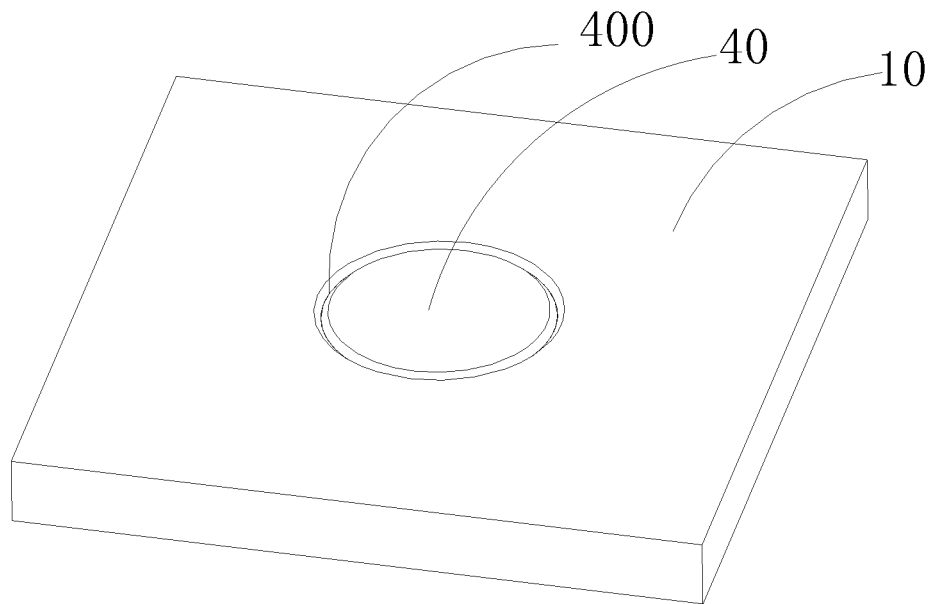
FIG. 2 is a schematic view of an assembly structure of a welding assembly for a liquid-injection hole of a secondary battery provided in the related art.
Figure 3:
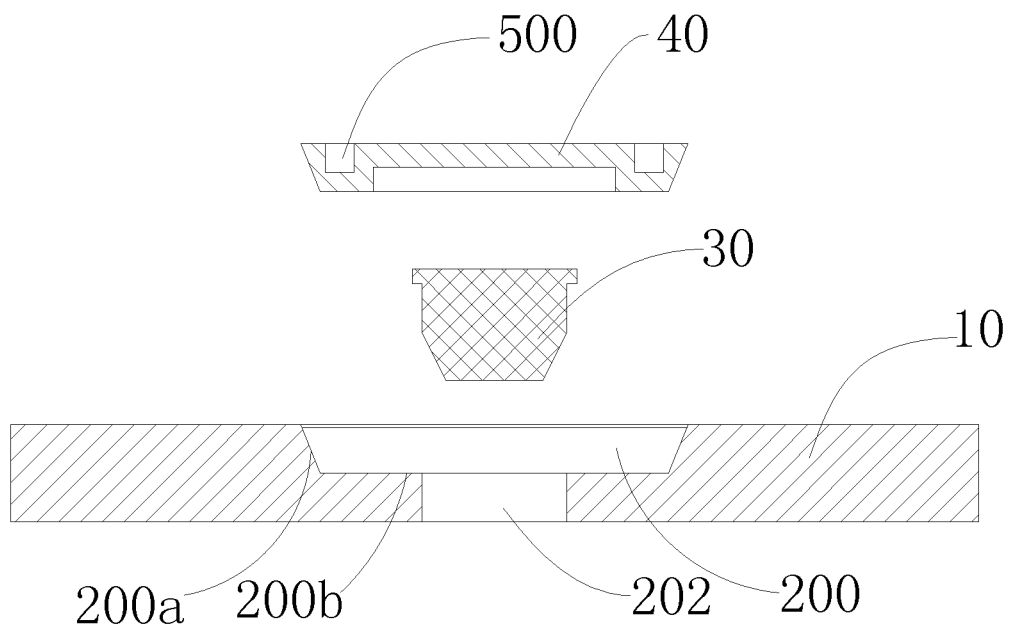
FIG. 3 is a schematic view of an exploded structure of a welding assembly for a liquid-injection hole of a secondary battery with a first stress release slot according to an embodiment of the present application.
Figure 4:
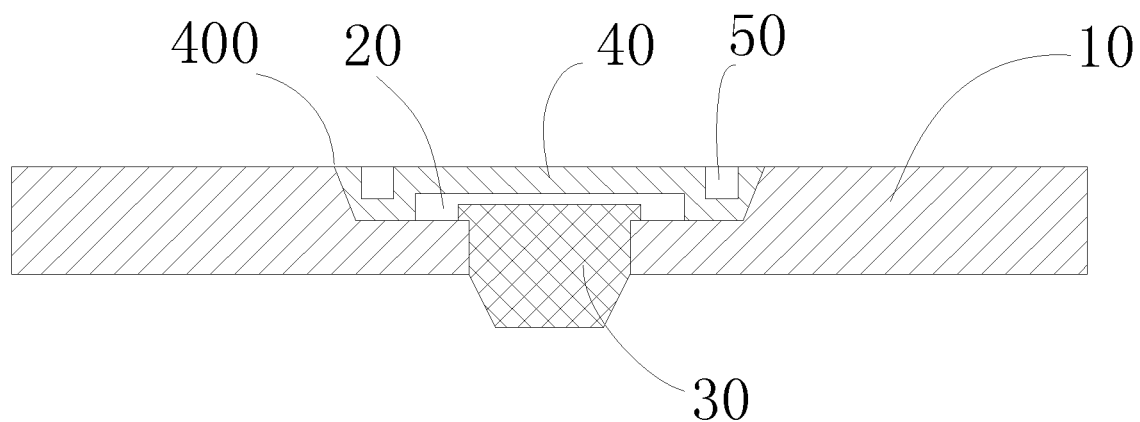
FIG. 4 is a schematic view of an assembly structure of a welding assembly for a liquid-injection hole of a secondary battery with a first stress release slot according to an embodiment of the present application.
Figure 5:
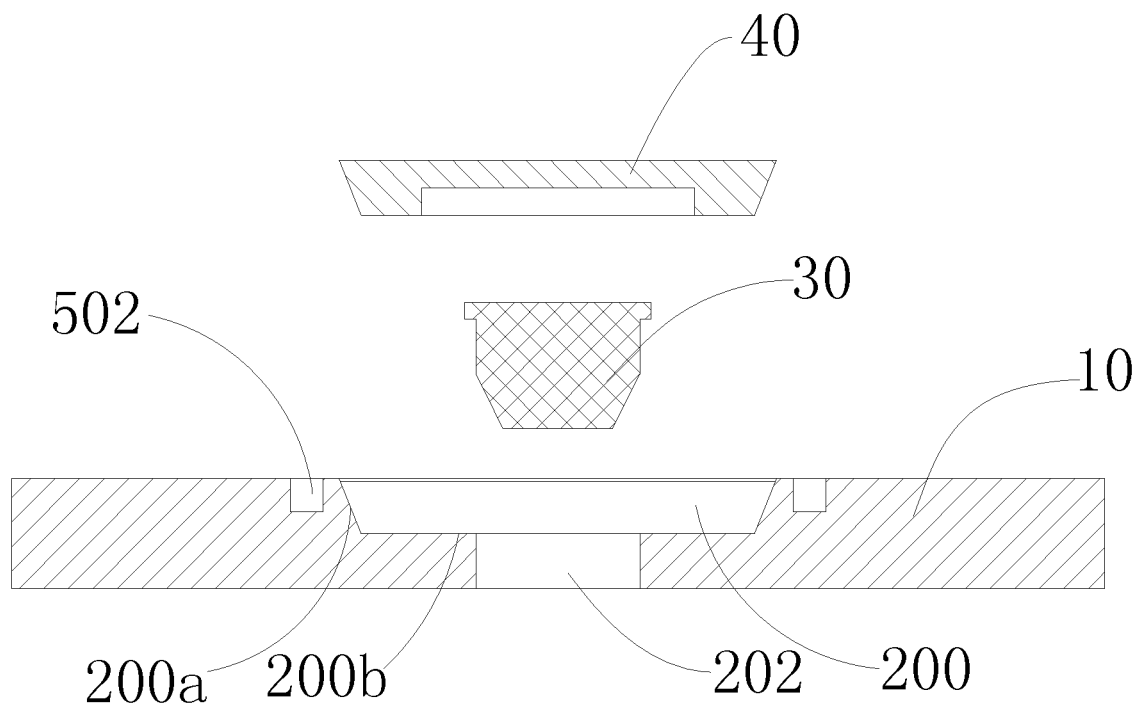
FIG. 5 is a schematic view of an exploded structure of a welding assembly for a liquid-injection hole of a secondary battery with a second stress release slot according to an embodiment of the present application.
Figure 6:
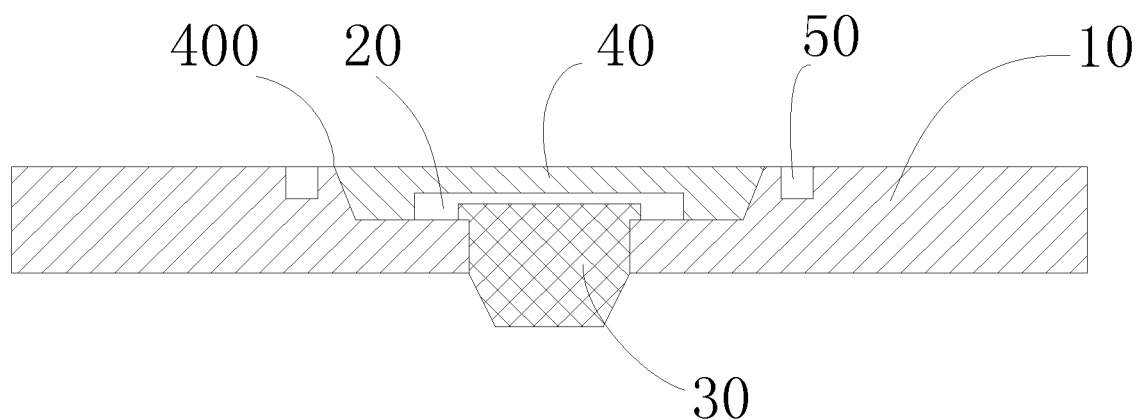
FIG. 6 is a schematic view of an assembly structure of a welding assembly for a liquid-injection hole of a secondary battery with a second stress release slot according to an embodiment of the present application.
Figure 7:
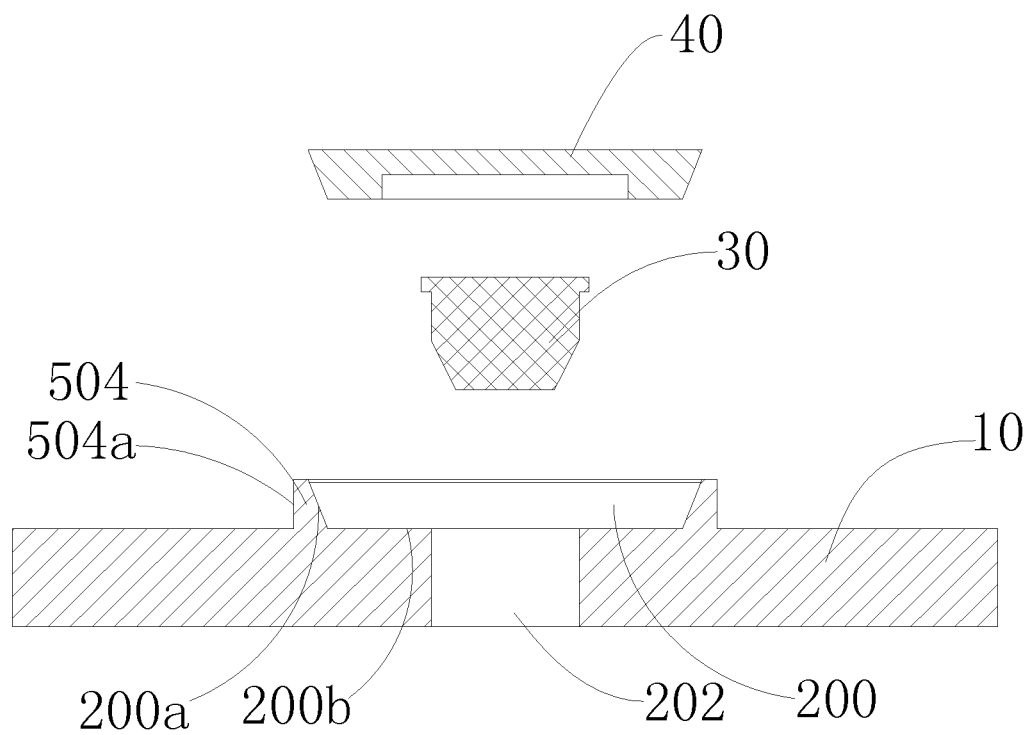
FIG. 7 is a schematic view of an exploded structure of a welding assembly for a liquid-injection hole of a secondary battery with an annular boss according to an embodiment of the present application.
Figure 8:
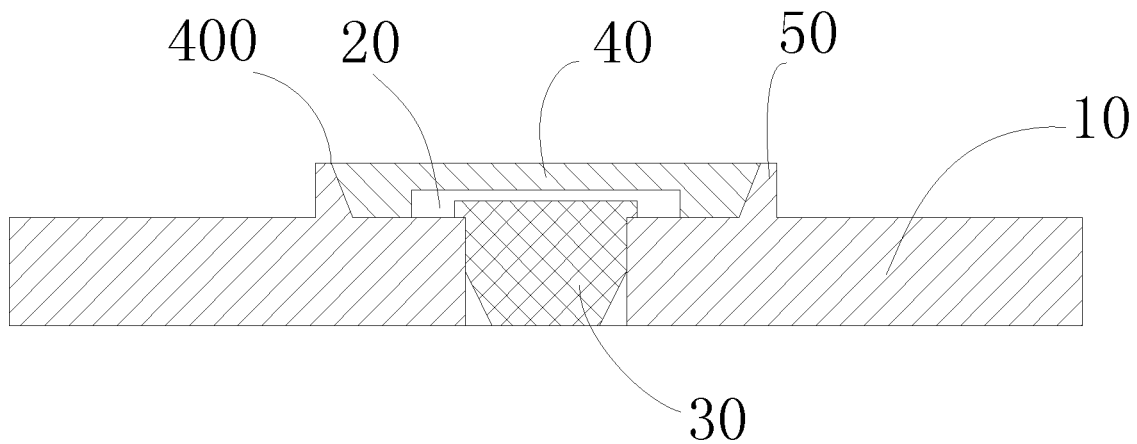
FIG. 8 is a schematic view of an assembly structure of a welding assembly for a liquid-injection hole of a secondary battery with an annular boss according to an embodiment of the present application.
Figure 9:
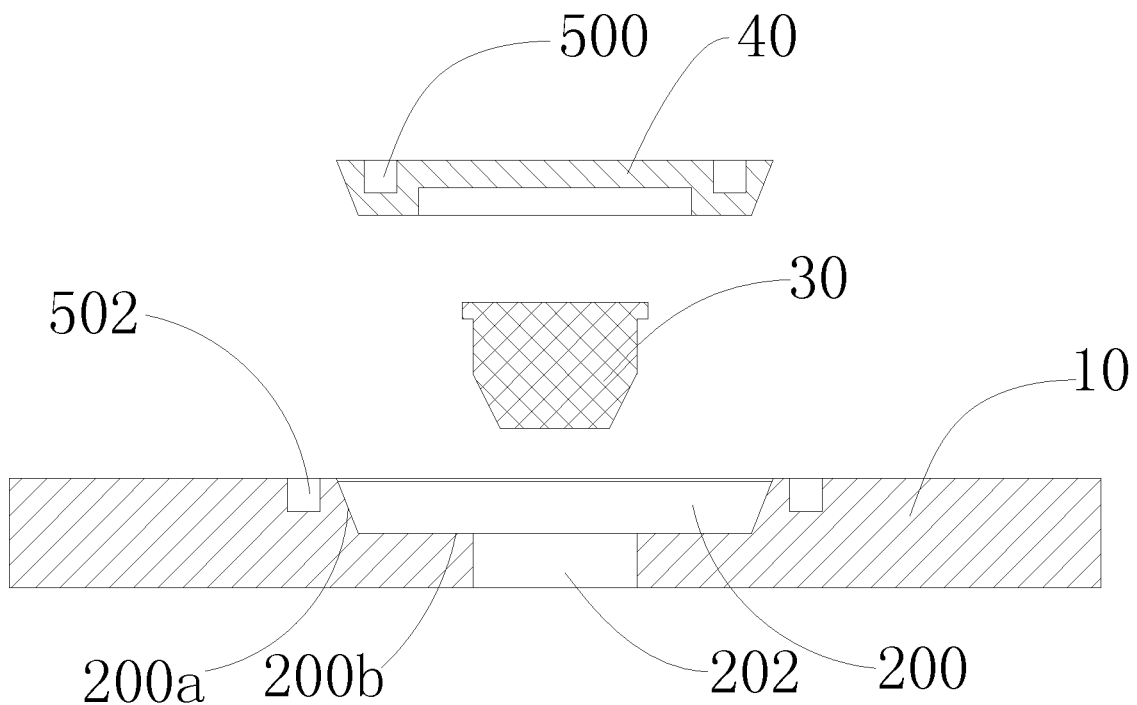
FIG. 9 is a schematic view of an exploded structure of a welding assembly for a liquid-injection hole of a secondary battery with both a first stress release slot and a second stress release slot according to an embodiment of the present application.
Figure 10:
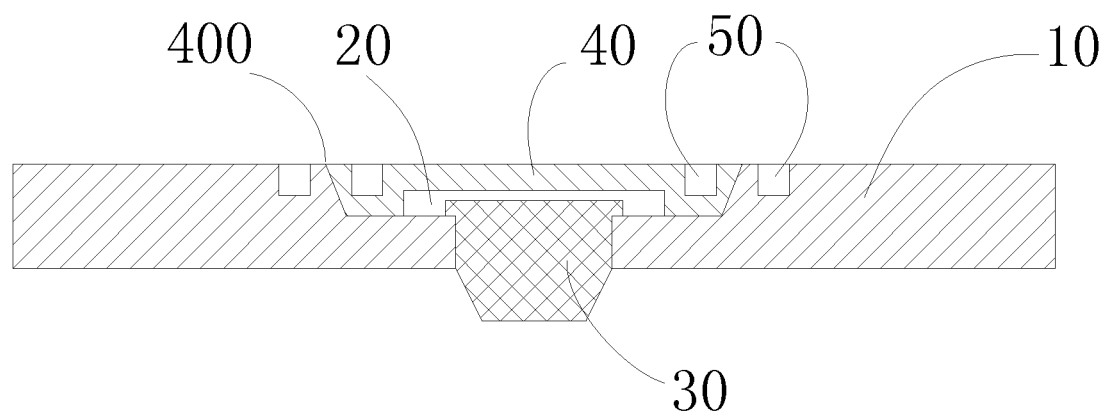
FIG. 10 is a schematic view of an assembly structure of a welding assembly for a liquid-injection hole of a secondary battery with both a first stress release slot and a second stress release slot according to an embodiment of the present application.
Figure 11:
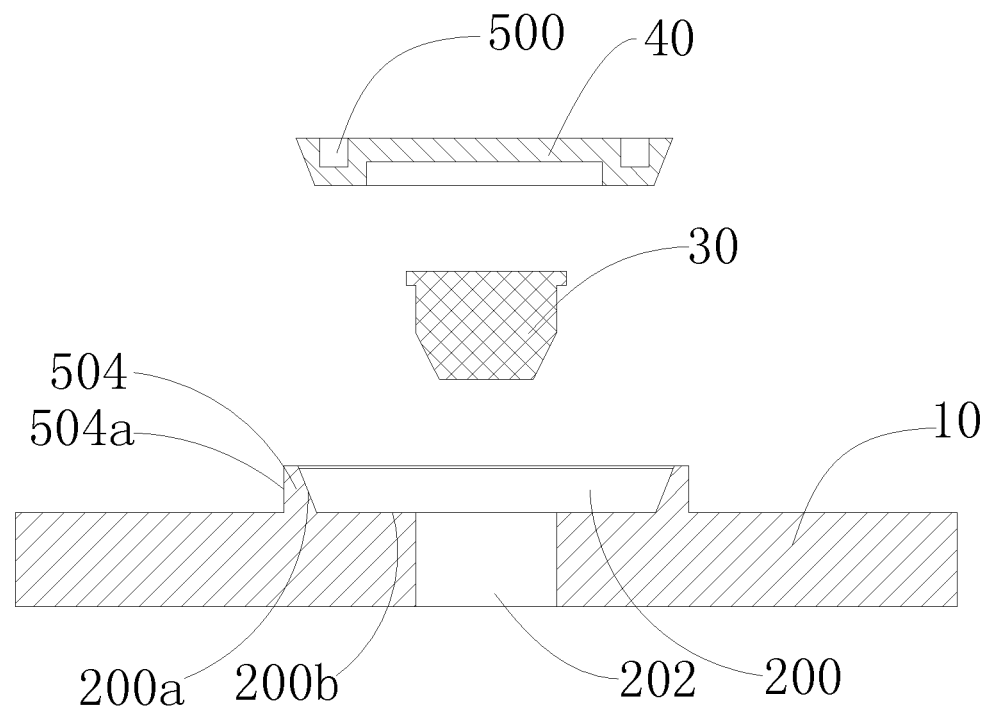
FIG. 11 is a schematic view of an exploded structure of a welding assembly for a liquid-injection hole of a secondary battery with both a first stress release slot and an annular boss according to an embodiment of the present application.
Figure 12:
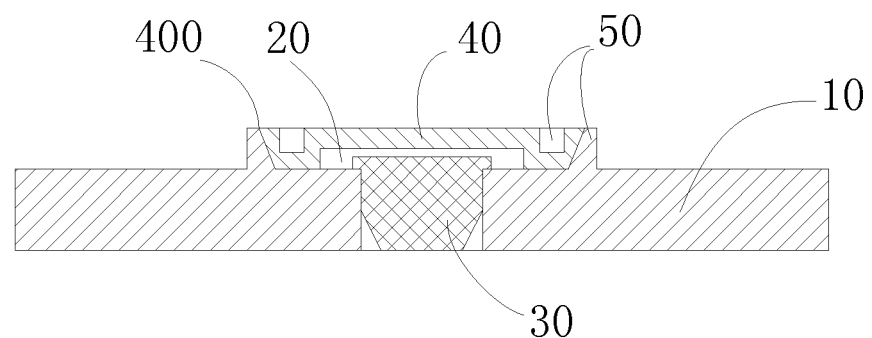
FIG. 12 is a schematic view of an assembly structure of a welding assembly for a liquid-injection hole of a secondary battery with both a first stress release slot and an annular boss according to an embodiment of the present application.

10—top cover of case;
20—liquid-injection hole;
   200—assembling recess; 200a—lateral surface; 200b—bottom surface; 202—through-hole;
30—sealing nail;
40—sealing cover-plate;
   400—welding portion;
   402—avoiding chamber;
   404—partition wall;
50—stress release structure;
   500—first stress release slot; 502—second stress release slot; 504—annular boss; 504a—external lateral surface.

The drawings herein are incorporated into and constitute a part of the specification, which show the embodiments of the present application and illustrate the principles of the present application together with the specification.

DESCRIPTION OF EMBODIMENTS

The present application will be further described in detail by specific embodiments and with reference to the accompanying drawings. The terms "front", "rear", "left", "right", "upper" and "lower" herein refer to the placement of the welding assembly for a liquid-injection hole of the secondary battery in the accompanying drawings.

As shown in FIGS. 3-12, an exemplary embodiment of the present application provides a welding assembly for a liquid-injection hole of a secondary battery, including: a top cover 10 of a case, a liquid-injection hole 20, a sealing nail 30, a sealing cover-plate 40, and a stress release structure 50.

The top cover 10 and the sealing cover-plate 40 may be made of a metal material such as aluminum, aluminum alloy, stainless steel or iron, etc. The liquid-injection hole 20 is defined in the top cover 10 and extends from top to bottom of the top cover 10 along a thickness direction of the top cover 10, the liquid-injection hole 20 includes an assembling recess 200 and a through-hole 202. The assembling recess 200 and the through-hole 202 present a stepped transition. The radial dimension of the assembling recess 200 is greater than the radial dimension of the through-hole 202.

The dimension of the through-hole 202 matches the dimension of the sealing nail 30, the sealing nail 30 can be made of rubber or silica gel material, when the sealing nail 30 is inserted into the through-hole 202, the through-hole 202 can be sealed. The through-hole 202 can also be sealed by gluing a film to the bottom surface 200b of the assembling recess 200. The material of the film can be plastic, metal or plastic-metal composite material. The assembling recess 200 is used for accommodating the sealing cover-plate 40. An upper edge of the assembling recess 200 and an upper edge of the sealing cover-plate 40 form a welding portion 400 for welding. The welding portion 400 is generally an annular gap having a width of 0-0.3 mm. Full-length welding is implemented along the welding portion 400 so that the sealing cover-plate 40 and the top cover 10 can be sealed.

The stress release structure 50 is arranged on an inner side or an outer side of the welding part 400 and functions to release the welding stress from the welding portion 400. The stress release structure 50 will be described in detail as follows.

In an embodiment of the present application, the stress release structure 50 may be disposed only at the inner side of the welding part 400 (see FIGS. 3-4), that is, a first stress release slot 500 disposed on the sealing cover-plate 40. The first stress release slot 500 is distributed annularly along the edge of the sealing cover-plate 40. The first stress release slot 500 can be a complete annular structure, or can be composed of several segments distributed annularly. After completion of the electrolyte injection, the interior and periphery of the assembling recess 200 are simply cleaned, and then the sealing cover-plate 40 can be added thereon and the welding is implemented. When the welding is completed, since the first stress release slot 500 is disposed at the inner side of the welding seam, the welding stress at the inner side of the welding portion 400 can be released.

In an embodiment, in order to prevent the sealing cover-plate 40 from interfering with the sealing nail 30, an avoiding chamber 402 recessed toward the interior of the sealing cover-plate 40 may be provided at the bottom of the sealing cover-plate 40, and the avoiding chamber 402 can avoid the top of the sealing nail 30, so as to avoid the touch interference between the two. The avoiding chamber 402 is in the surrounding area of the first stress release slot 500 and is separated from the first stress release slot 500 by a partition wall 404.

Figure 13:
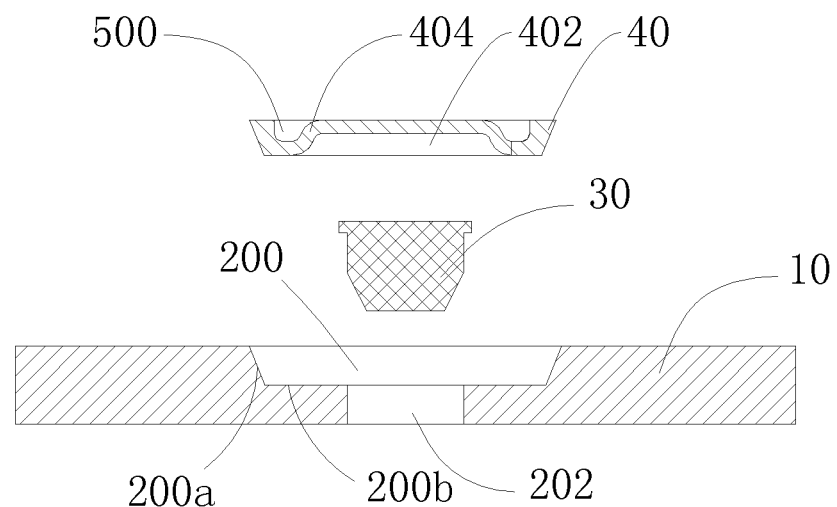
FIG. 13 is a schematic view of an exploded structure of a welding assembly for a liquid-injection hole of a secondary battery with a partition wall being inwardly tilted according to an embodiment of the present application.
Figure 14:
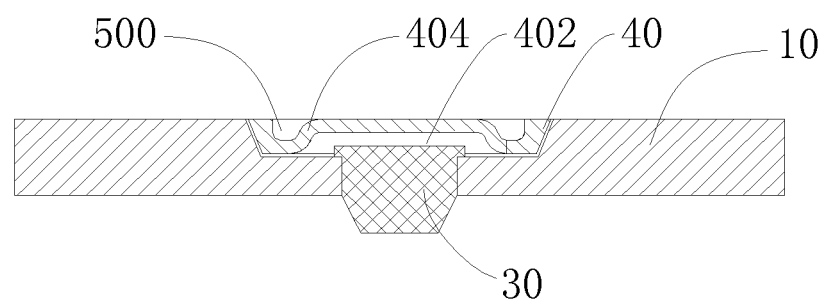
FIG. 14 is a schematic view of an assembly structure of a welding assembly for a liquid-injection hole of a secondary battery with a partition wall being inwardly tilted according to an embodiment of the present application.

In this case, the stress release effect can be further improved via the following two manners. The first manner is to design the thickness of the partition wall 404 to be smaller than the wall thickness between the avoiding chamber 402 and the upper surface of the sealing cover-plate 40, so that the partition wall 404 is more easily deformed to release the stress. The second manner is to obliquely dispose the partition wall 404 so as to convert the stress from the horizontal direction to a force in the vertical direction via the partition wall 404, so that the thickness of the cover cover-plate 40 can be changed to offset the stress. In this case, the partition wall 404 is preferably inwardly tilted from bottom to top toward the middle of the sealing cover-plate 40, so as to form an opening structure for both the first stress release slot 500 and the avoiding chamber 402, which further facilitates the stress releasing. In addition, in order to prevent the first stress release slot 500 or the avoiding chamber 402 from being torn due to the excessive angle change at the partition wall 404, resulting from the deformation, the first stress release slot 500 and the avoiding chamber 402 may be provided with fillets in between with the partition wall 404 for transition (with reference to FIGS. 13-14).

The structure described above can better release the stress at the inner side of the welding portion 400, that is, the stress in the sealing cover-plate 40. However, such a structure cannot release the welding stress at the outer side of the welding portion 400.

In addition, in an embodiment, the stress release structure 50 may also be disposed only at the outer side of the welding portion 400, that is, disposed at the top cover 10. In this case, there may be two structures available. The first structure is similar to the first stress release slot 500, which is, a second stress release slot 502 is provided on the top cover 10 and distributed annularly along the edge of the assembling recess 200 (with reference to FIGS. 5-6). The second stress release slot 502 is distributed annularly along the edge of the assembling recess 200. Similar to the first stress release slot 500, the second stress release slot 502 may also be a complete annular structure or be composed of several segments distributed annularly. The second structure is to provide an annular boss 504 at the top cover 10 with its top surface disposed above the surface of the top cover 10, the assembling recess 200 is disposed within the annular boss 504 and surrounded by the annular boss 504 (with reference to FIGS. 7-8). Both the two structures provide sufficient buffer at the outer side of the welding seam so as to provide desired release of welding stress at the outer side, but on the contrary, the welding stress at the inner side cannot be released in this embodiment. In addition, in both the two structures, since the stress release structure 50 is disposed at the top cover 10, the electrolyte often accumulates in the included angle between the second stress release slot 502 or the annular boss 504 and the top cover 10, therefore, when using any of the two structures, a deep cleaning process is required before welding, which is to clean up the accumulated electrolyte using dimethyl carbonate (DMC).

When using the second structure, the included angle between the external lateral surface 504a of the annular boss 504 and the top cover 10 can be set as a right angle or an obtuse angle. The larger the angle is, the less possibility the electrolyte may accumulate, thereby making the cleaning process easier.

Since the above structures can only release the welding stress at only a single side (i.e., the inner side or the outer side), it is still necessary that the laser adopts a greater pulse width parameter to reduce the welding stress during welding, therefore, the welding cost is high, and the welding stress improvement effect is insignificant. In order to improve the stress release effect, it is preferred to provide the stress release structure 50 at both sides of the welding seam, that is, on both the top cover 10 and the sealing cover-plate 40. During matching, it is possible that the first stress release slot 500 is selected to be matched with the second stress release slot 502 (with reference to FIGS. 9-10), or the first stress release slot 500 is selected to be matched with the annular boss 504 (with reference to FIGS. 11-12).

As for the first stress release slot 500 and the second stress release slot 502, both of the two preferably keep a shortest distance of 0.1-1 mm away from the welding portion 400, respectively. The farther the distance is, the less the stress release effect is. The shape of the cross-section of the first stress release slot 500 and the second stress release slot 502 may be rectangular, trapezoidal, arc or triangular etc. Based on the difference of the model and size of the secondary battery, and difference of the thickness of the top cover 10 and the sealing cover-plate 40, in a general case, the top cover 10 has a thickness of 0.6-6 mm, the first stress release slot 500 and the second stress release slot 502 have a depth reasonably selected in the range of 0.1-5.5 mm. When the depth is too large, the structural strength of the top cover 10 and the sealing cover-plate 40 will be affected, and when the depth is too small, the stress release capacity will be decreased.

As for the annular boss 504, the minimum thickness should be within the range of 0.1-1 mm, the larger the thickness is, the less the stress release effect is. However, when the thickness is too small, it may easily cause the annular boss 504 to be damaged due to the insufficient strength. The height of the annular boss 504 may be within the range of 0.1-5.5 mm, when the height is too large, the manufacturing cost of annular boss 504 will be increased, and when the height is too small, the stress release capacity will be decreased.

In order to improve the matching precision between the sealing cover-plate 40 and the assembling recess 200 while reducing the assembling difficulty, it is preferable to keep the included angle between the lateral surface 200a and the bottom surface 200b of the assembling recess 200 to be f a right angle or an obtuse angle, and the larger the angle is, the easier the assembling will be.

In an embodiment, in order to further simplify the welding packaging process, the sealing nail 30 and the sealing cover-plate 40 can be fixed together, which makes it possible to omit the step of separately inserting the sealing nail 30 into the liquid-injection hole 20.

The above description only shows preferred embodiments of the present application and is not intended to limit the present application. Various replacements and modifications may be made by those skilled in the art. Any modifications, equivalent replacements, improvements and the like made within the spirit and principles of the present application should be included in the protection scope of the present application.

What is claimed is:

1. A welding assembly for a liquid-injection hole of a secondary battery, comprising:
   a top cover of a case;
   a liquid-injection hole;
   a sealing cover-plate; and
   a stress release structure;
   wherein the liquid-injection hole is defined in the top cover and comprises an assembling recess and a through-hole arranged sequentially from top to bottom of the top cover,
   the sealing cover-plate is accommodated in the assembling recess without falling into the through-hole, and an upper edge of the sealing cover-plate and an upper edge of the assembling recess form a welding portion for welding,
   the stress release structure is provided at one side or both sides of the welding portion, and is configured to release stress from the welding portion,
   wherein the stress release structure comprises a first stress release slot provided on the sealing cover-plate, and the first stress release slot is distributed annularly along an edge of the sealing cover-plate, and
   wherein an avoiding chamber recessed toward an interior of the sealing cover-plate is provided at the bottom of the sealing cover-plate, and the avoiding chamber is surrounded by the first stress release slot and is separated from the first stress release slot by a partition wall.

2. The welding assembly according to claim 1, wherein the stress release structure further comprises a second stress release slot provided on the top cover, and the second stress release slot is distributed annularly along an edge of the assembling recess.

3. The welding assembly according to claim 2, wherein a shortest distance from the first stress release slot and/or the second stress release slot to the welding portion is 0.1-1 mm.

4. The welding assembly according to claim 2, wherein a shape of a cross section of the first stress release slot and/or the second stress release slot is rectangular, trapezoidal, arc or triangular.

5. The welding assembly according to claim 2, wherein a depth of the first stress release slot and/or the second stress release slot is 0.1-5.5 mm.

6. The welding assembly according to claim 1, wherein the stress release structure comprises an annular boss provided on the top cover, and the assembling recess is surrounded by the annular boss.

7. The welding assembly according to claim 6, wherein a minimum thickness of the annular boss is 0.1-1 mm.

8. The welding assembly according to claim 6, wherein a height of the annular boss is 0.1-5.5 mm.

9. The welding assembly according to claim 6, wherein an included angle between an external lateral surface of the annular boss and the top cover is a right angle or an obtuse angle.

10. The welding assembly according to claim 1, wherein a thickness of the partition wall is smaller than a thickness between the avoiding chamber and an upper surface of the sealing cover-plate.

11. The welding assembly according to claim 1, wherein the partition wall is obliquely arranged.

12. The welding assembly according to claim 11, wherein the partition wall is inwardly tilted from bottom to top toward the middle of the sealing cover-plate.

13. The welding assembly according to claim 12, wherein a fillet transition is formed between the first stress release slot and/or the avoiding chamber and the partition wall.

* * * * *